US006963150B2

(12) United States Patent
Isoda et al.

(10) Patent No.: US 6,963,150 B2
(45) Date of Patent: Nov. 8, 2005

(54) ELECTRIC ROTATING MACHINE FOR VEHICLE

(75) Inventors: Hitoshi Isoda, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 3 days.

(21) Appl. No.: 10/756,547

(22) Filed: Jan. 14, 2004

(65) Prior Publication Data

US 2005/0151433 A1    Jul. 14, 2005

(51) Int. Cl.[7] .............................................. H02K 11/00
(52) U.S. Cl. ........................................ 310/71; 310/254
(58) Field of Search ............................... 310/71, 68 D, 310/179, 254, 261

(56) References Cited

U.S. PATENT DOCUMENTS

| | | |
|---|---|---|
| 2,668,925 A | 2/1954 | Bloser |
| 2,802,958 A | 8/1957 | Curley |
| 3,250,928 A | 5/1966 | Bates |
| 3,283,186 A | 11/1966 | Perry |
| 4,543,504 A * | 9/1985 | Iwaki et al. ............... 310/68 D |
| 6,271,608 B1 | 8/2001 | Haydock et al. |
| 6,429,556 B1 * | 8/2002 | Nakamura et al. ............. 310/71 |
| 6,737,772 B2 * | 5/2004 | Tanaka et al. ................. 310/71 |

FOREIGN PATENT DOCUMENTS

| | | |
|---|---|---|
| DE | 41 10 474 A1 | 10/1992 |
| DE | 697 05 939 T2 | 10/1997 |
| GB | 1 390 681 A | 4/1975 |
| GB | 2 099 240 A | 12/1982 |
| JP | 08-149743 A | 6/1996 |
| JP | 09-019119 A | 1/1997 |

* cited by examiner

Primary Examiner—Thanh Lam
(74) Attorney, Agent, or Firm—Sughrue Mion, PLLC

(57) ABSTRACT

Reductions in cost and manufacturing processes are achieved by interposing a single metallic terminal between a lead wire of a stator and a three-phase output terminal. A rotor 3 is fixed onto a rotating shaft 2 disposed rotatably in a housing 1, and a stator core 5 is disposed opposite to the rotor 3. A stator winding 6 is wound around the stator core 5 and a lead wire 10 of the stator winding 6 is connected to a head portion 8a of a three-phase output terminal 8 through a single metallic terminal by a screw 12.

6 Claims, 5 Drawing Sheets

ELECTRIC ROTATING MACHINE FOR VEHICLE

BACKGROUND OF THE INVENTION

1. Field of the Invention

The present invention relates to an electric rotating machine for vehicle and, more particularly, to improvement in connection of a stator winding thereof.

2. Description of the Related Art

FIG. 8 is a sectional view showing a conventional electric rotating machine for vehicle. In the drawing, numeral 21 designates a front bracket, numeral 22 designates a rear bracket and numeral 23 designates a rotor. The rotor 23 includes a rotating shaft 24, field cores 25a and 25b, a field winding 26, and cooling fans 27a and 27b. Both front bracket 21 and rear bracket 22 support the rotating shaft 24 through bearings 28a and 28b. The field cores 25a and 25b are of Randel-type and the field winding 26 is internally wound thereon.

The field cores 25a and 25b are fitted into the rotating shaft 24 and rotate integrally with the rotating shaft 24. The cooling fans 27a and 27b are fixed onto sides of the field cores 25a and 25b respectively. Numeral 29 designates an armature acting as a stator, which includes an armature core 30 acting as a stator core and an armature winding 31 acting as a stator winding. The armature winding 31 is inserted into a slot of the armature core 30, and a coil end of the armature winding 31 protrudes from the armature core 30 in the axial direction. The armature core 30 has an internal peripheral wall forming a cylindrical hollow portion, and the rotor 23 is inserted in this hollow portion.

In the conventional electric rotating machine for vehicle of above construction, a three-phase output terminal 32 and a lead wire 33 of the stator are connected through a metallic terminal 34, which is connected to the lead wire 33 of a winding wound around the stator core 30, and through a metallic terminal 36, which is embedded in an insulator 35 made of resin.

Since the conventional electric rotating machine for vehicle has been constructed as described above, plural metallic terminals are essentially required between the three-phase output terminal and the lead wire of the winding wound around the stator core. Accordingly, a problem exists in that excessive cost and complicated manufacturing processes have been required.

Moreover, since there are metallic terminals formed by resin molding, a further problem exists in that combustion loss may occur if a large current passes through, and that resistance of the metallic terminal brings about reduction in both output and efficiency.

SUMMARY OF THE INVENTION

The present invention has been made to solve the above-discussed problems and has an object of reducing not only cost and manufacturing processes but also resistance of the metallic terminal in order to improve output and efficiency by interposing just a single metallic terminal between a lead wire of a stator and a three-phase output terminal.

An electric rotating machine for vehicle of the invention includes a rotor fixed onto a rotating shaft disposed in a housing, a stator core disposed opposite to the rotor, a stator winding wound around the stator core, and a three-phase output terminal to which a lead wire of the stator winding is connected. And the lead wire is connected to the three-phase output terminal through a single metallic terminal. As a result, not only cost and manufacturing processes but also resistance is reduced, and therefore output and efficiency are improved.

DESCRIPTION OF THE PREFERRED EMBODIMENTS

Embodiment 1

An embodiment of the present invention is hereinafter described with reference to the accompanying drawings.

Figure 1:
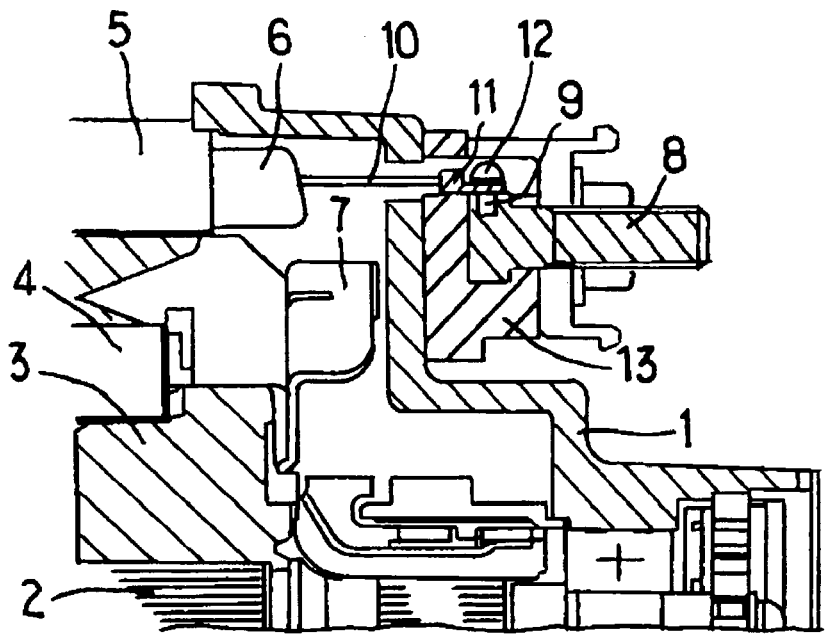
FIG. 1 is a partially sectional view showing an electric rotating machine for vehicle according to Embodiment 1 of the present invention.

FIG. 1 is a partially sectional view showing an electric rotating machine for vehicle according to Embodiment 1 of the invention, and in which the electric rotating machine for vehicle starts an engine by acting as a motor and supplies power to the vehicle by acting as a generator.

In the drawing, numeral 1 designates a housing, numeral 2 designates a rotating shaft disposed in the housing 1 and numeral 3 designates a rotor fixed onto the rotating shaft 2. Numeral 4 designates a field winding wound around the rotor 3, numeral 5 designates a stator core disposed opposite to the rotor 3 and numeral 6 designates a stator winding wound around the stator core 5. Numeral 7 designates a cooling fan and numeral 8 designates a three-phase output terminal for taking out output from the stator.

Further, the three-phase output terminal 8 is provided with a threaded hole 9. At least one of lead wires 10 of the stator winding 6 wound around the stator core 5 is connected to the three-phase output terminal 8 through a single metallic terminal 11 by screwing with a screw 12.

The three-phase output terminal 8 is fixed at an external part of the housing 1 with an insulator 13 such as resin, and the insulator 13 is fixed to the housing 1. It is also preferable that the output terminal 8 is fixed at an internal part of the housing 1.

In this manner, since the single metallic terminal 11 interposes between the lead wire 10 and the three-phase output terminal 8, not only cost and manufacturing steps but also resistance is reduced, and as a result output and efficiency are improved.

Further, since any metallic terminal embedded in an insulator made of resin or the like is not required unlike the conventional technique, any combustion loss does not occur. Since the metallic terminal 11 is exposed, cooling efficiency is improved.

Furthermore, since a screw 12 connects the three-phase output terminal 8 and the lead wire 10 through the metallic terminal 11 by screwing, assembling becomes easier and manufacturing cost is reduced.

Additionally, an air-cooling system provided with the cooling fan 7 is adopted and cools around the lead wire 10 by cooling wind, the construction becomes simpler than that of water-cooling system.

Embodiment 2

Figure 2:
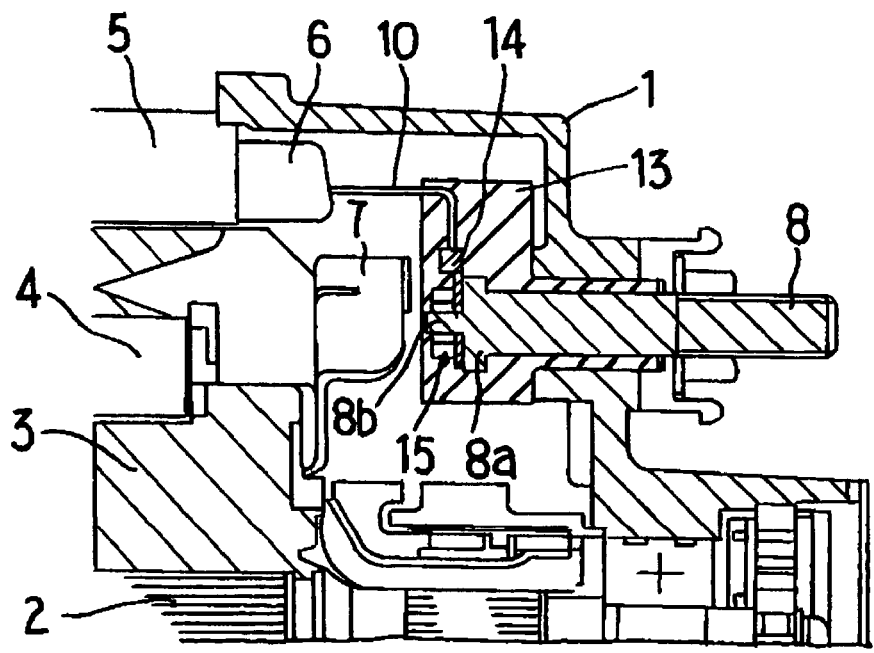
FIG. 2 is a partially sectional view showing an electric rotating machine for vehicle according to Embodiment 2 of the invention.

FIG. 2 is a partially sectional view showing an electric rotating machine according to Embodiment 2 of the invention. In this embodiment, a head portion 8*a* of a three-phase output terminal 8 is provided with a male screw 8*b*. A nut 15 connects at least one of the lead wires 10 of the stator winding 6 wound around the stator core 5 to the three-phase output terminal 8 through just a single metallic terminal 14.

In this manner, since a connection part between the lead wire 10 and the three-phase output terminal 8 is formed at the head portion 8*a* of the three-phase output terminal 8, the connection becomes easier.

Further, since the three-phase output terminal 8 and the metallic terminal 14 as well as the lead wire 10 of the stator winding 6 wound around the stator core 5 are fixed with the nut 15, strength of the three-phase output terminal 8 is sufficiently secured.

Furthermore, since the connection part between the lead wire 10 and the three-phase output terminal 8 is disposed at internal part of the housing 1, it becomes scarcely exposed to water, and therefore the corrosion-resistance is improved.

Figure 3:
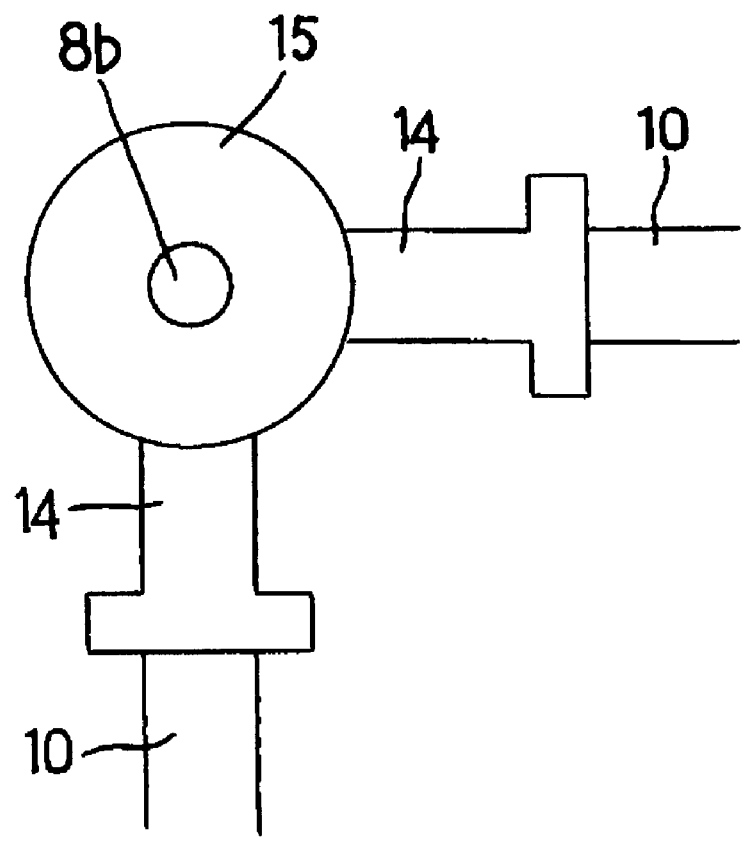
FIG. 3 is a front view showing a connection part between a lead wire and a three-phase output terminal.

In case that Y-connection is adopted on the stator side and the stator windings are not connected in parallel, one single lead wire 10 is sufficient. However, in case that Y-connection is adopted on the stator side and the stator windings are connected in parallel, or in case that delta-connection is adopted on the stator side, plural than lead wires 10 are required. To cope with this, it is also preferable that the nut 15 connects the plural metallic terminals 14 with the three-phase output terminal 8, as shown in FIG. 3.

Embodiment 3

This embodiment is the same as the foregoing Embodiment 2 in the aspect that the head portion 8*a* of the three-phase output terminal 8 is provided with the male screw 8*b*. In this embodiment, however, at least one lead wire 10 of the stator winding 6 wound around the stator core 5 is directly connected with the three-phase output terminal 8 with a nut 15, thus the metallic terminal 14 being omitted.

Figure 4:
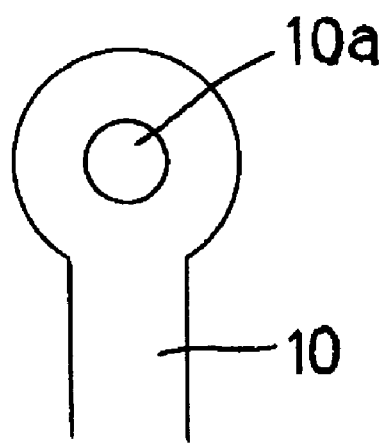
FIG. 4 is a front view showing a lead wire according to Embodiment 3 of the invention.

FIG. 4 is a front view showing the lead wire 10. Top end portion of the lead wire 10 is crushed so as to be provided with a hole 10*a*, through which the male screw 8*b* on the head portion 8*a* side of the three-phase output terminal 8 is inserted.

Although a nut is employed for fixation in the above description, it is also preferable that a screw is employed for fixation.

As described above, since no metallic terminal is interposed between the lead wire 10 and the three-phase output terminal 8, not only cost and manufacturing processes but also resistance are reduced, eventually resulting in improvement of output and efficiency.

Embodiment 4

In this embodiment, at least one of lead wires 10 of the stator winding 6 wound around the stator core 5 is connected by TIG welding directly to the three-phase output terminal 8 on the head portion 8*a* side.

Figure 5:
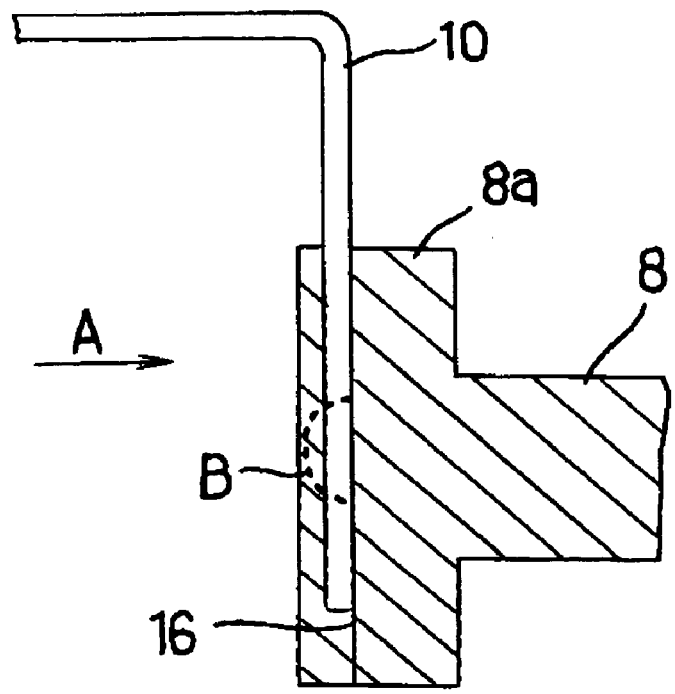
FIG. 5 is a sectional view showing a three-phase output terminal part according to Embodiment 4 of the invention.
Figure 6:
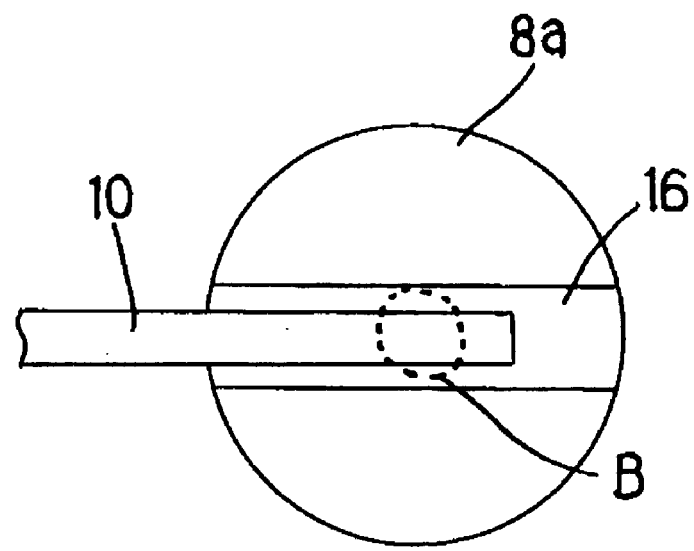
FIG. 6 is a front view taken in the direction A of FIG. 5.

FIG. 5 is a sectional view showing the three-phase output terminal 8 portion and FIG. 6 is a front view taken in A direction of FIG. 5.

In the drawings, the lead wire 10 is put on a groove 16 provided on the head portion 8*a* of the three-phase output terminal 8, and the lead wire 10 and the three-phase output terminal 8 are directly connected by TIG welding B.

Instead of welding, the lead wire 10 may be connected by brazing.

Figure 7:
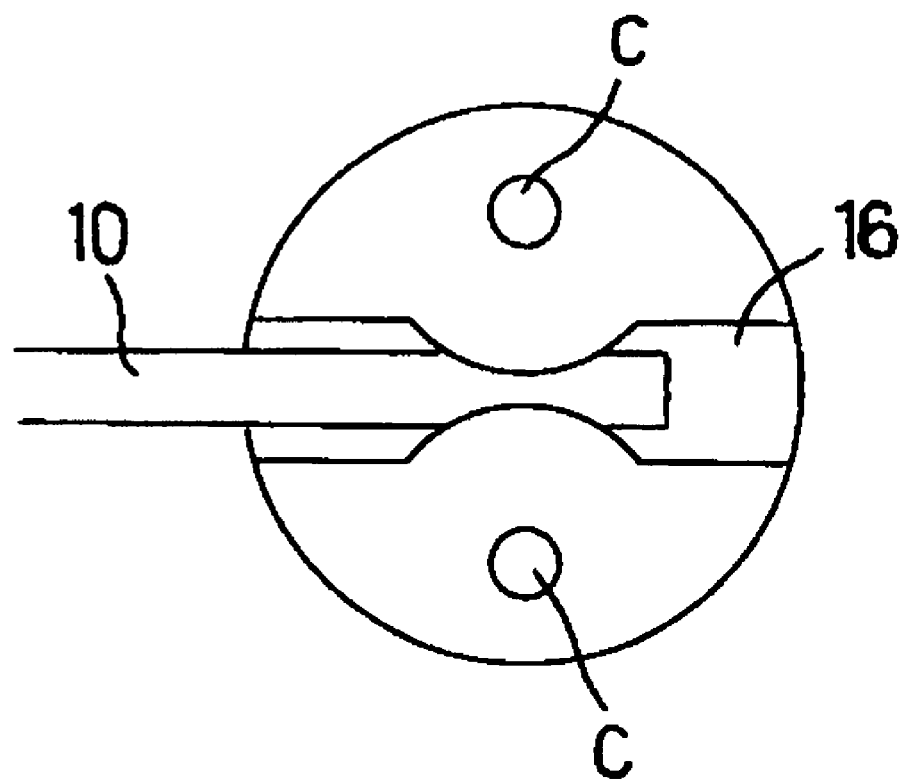
FIG. 7 is a front view showing a connection part between a lead wire and a three-phase output terminal.
Figure 8:
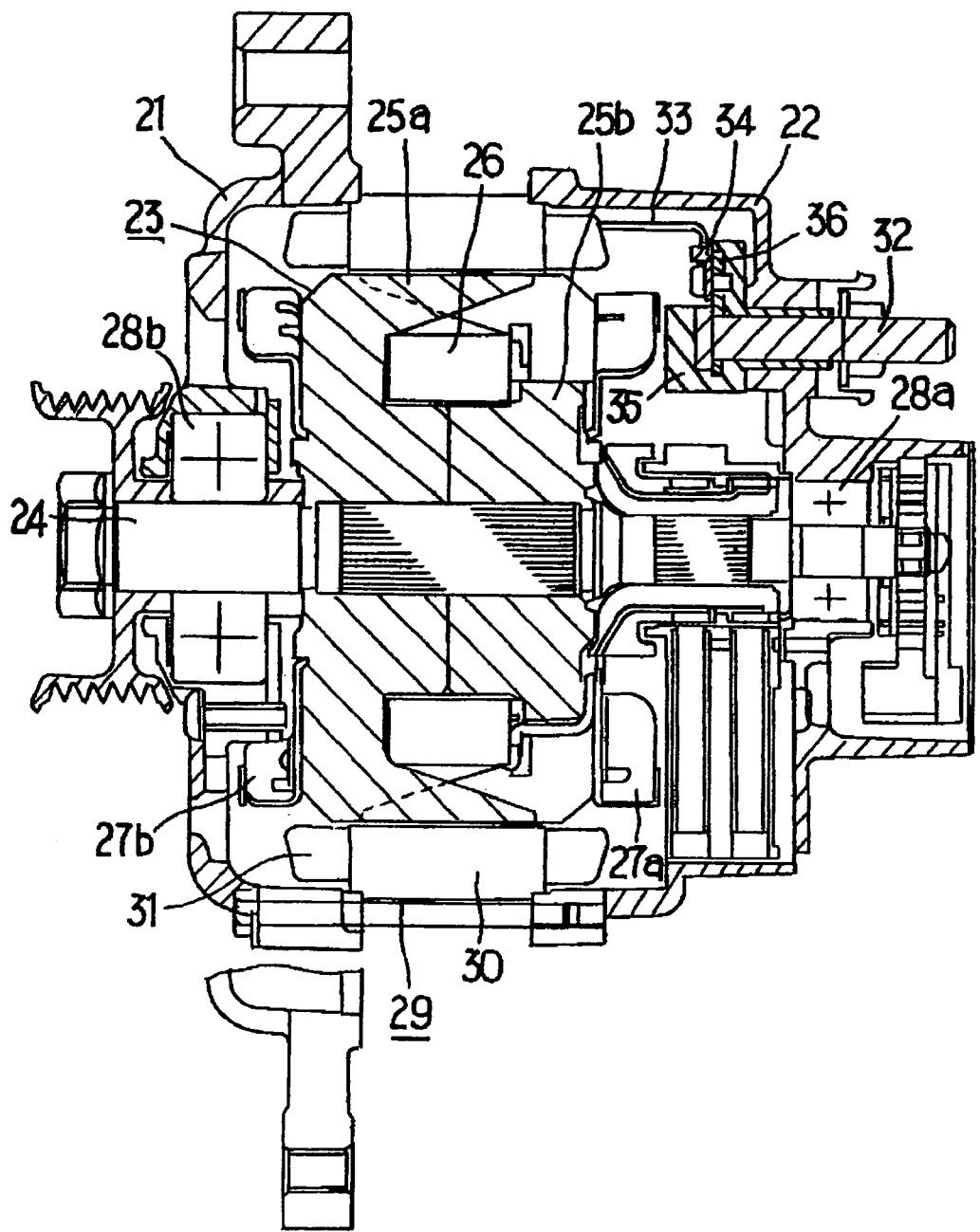
FIG. 8 is a sectional view showing a conventional electric rotating machine for vehicle.

Furthermore, as shown in FIG. 7, the lead wire 10 may be connected to the head portion 8*a* of the three-phase output terminal 8 by caulking, in which caulking punch is applied to C portions.

As described above, the three-phase output terminal 8 and the lead wire 10 of the stator winding 6 wound around the stator core 5 are connected by welding, caulking at the three-phase output terminal head portion 8*a* or brazing without any connection member. As a result, no part such as screw or nut is required, eventually resulting in further cost reduction.

While the presently preferred embodiments of the present invention have been shown and described.

It is to be understood that these disclosures are for the purpose of illustration and that various changes and modifications may be made without departing from the scope of the invention as set forth in the appended claims.

What is claimed is:

1. An electric rotating machine for vehicle comprising: a rotor fixed onto a rotating shaft disposed in a housing, a stator core disposed opposite to said rotor, a stator winding wound around said stator core, and a three-phase output terminal to which a lead wire of said stator winding is connected;

wherein said lead wire is connected to said three-phase output terminal through a single metallic terminal.

2. An electric rotating machine for vehicle according to claim 1, wherein a screw connects said lead wire to said three-phase output terminal.

3. An electric rotating machine for vehicle according to claim 1, wherein a nut connects said lead wire to said three-phase output terminal.

4. An electric rotating machine for vehicle according to claim 1, wherein a connection part between said lead wire and said three-phase output terminal is disposed at a head portion of said three-phase output terminal.

5. An electric rotating machine for vehicle according to claim 1, wherein the connection part between said lead wire and said three-phase output terminal is disposed at an internal part of said housing.

6. An electric rotating machine for vehicle according to claim 1, wherein a cooling system for cooling around said lead wire is of air-cooling type.

* * * * *